June 19, 1945.    G. N. SCOTT    2,378,440
PROCESS AND MEANS FOR MEASURING SOIL RESISTIVITY AND CERTAIN
ELECTRICAL CHARACTERISTICS ASSOCIATED WITH BURIED PIPELINES
Filed Jan. 27, 1941    5 Sheets-Sheet 3
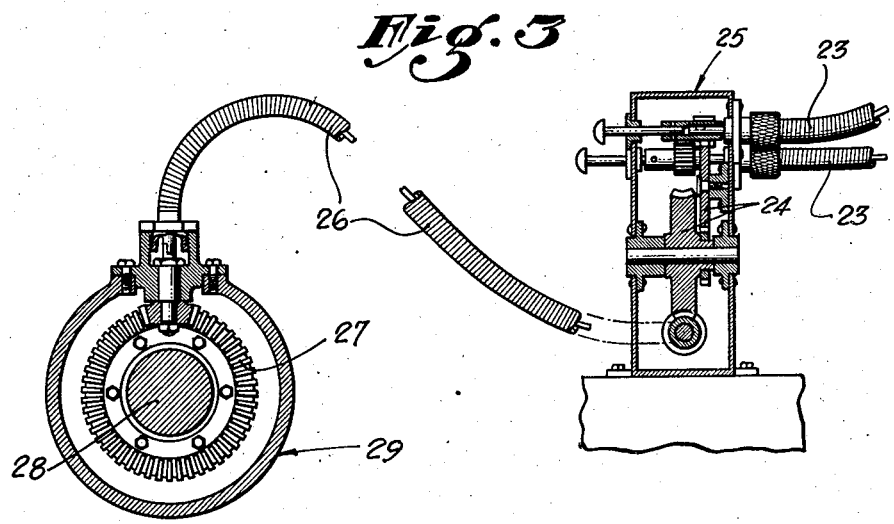
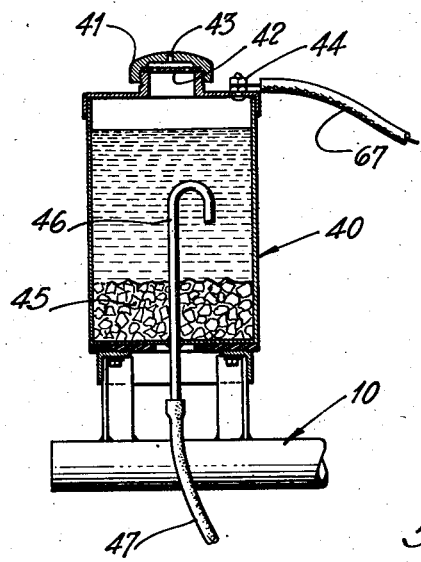
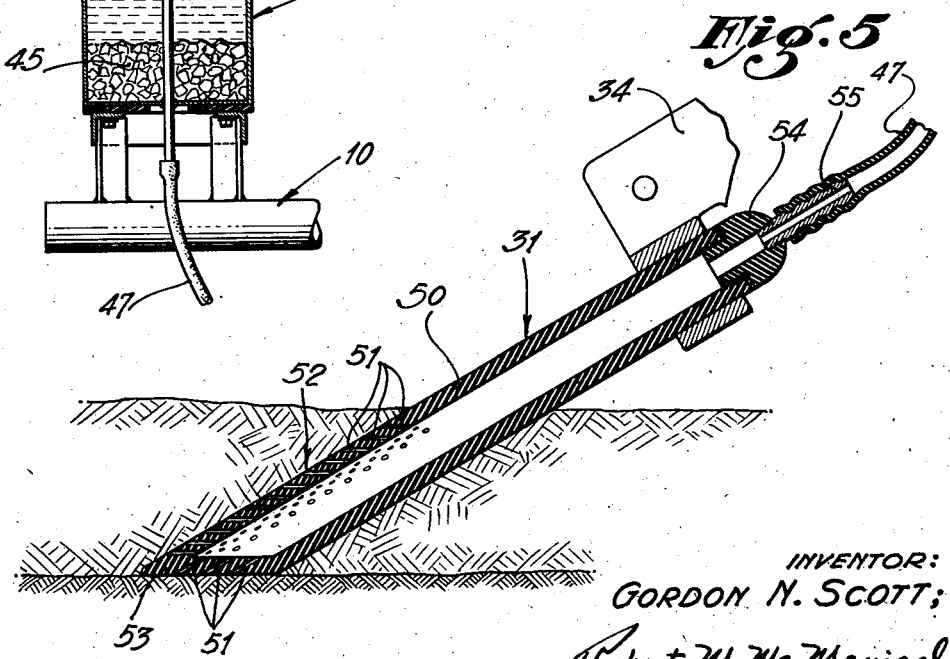
INVENTOR:
GORDON N. SCOTT;
BY Robert M. McManigal
ATTORNEY.

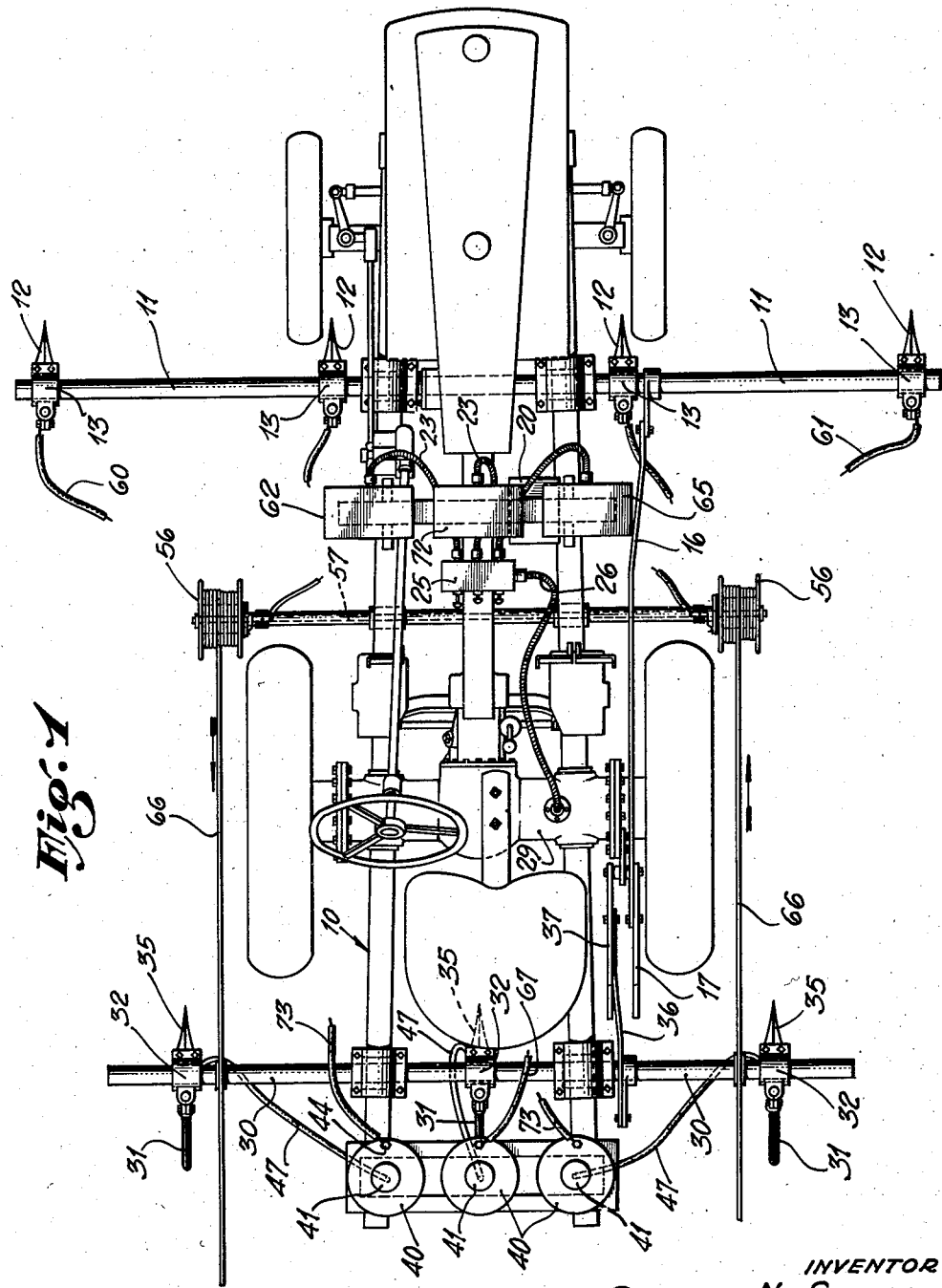

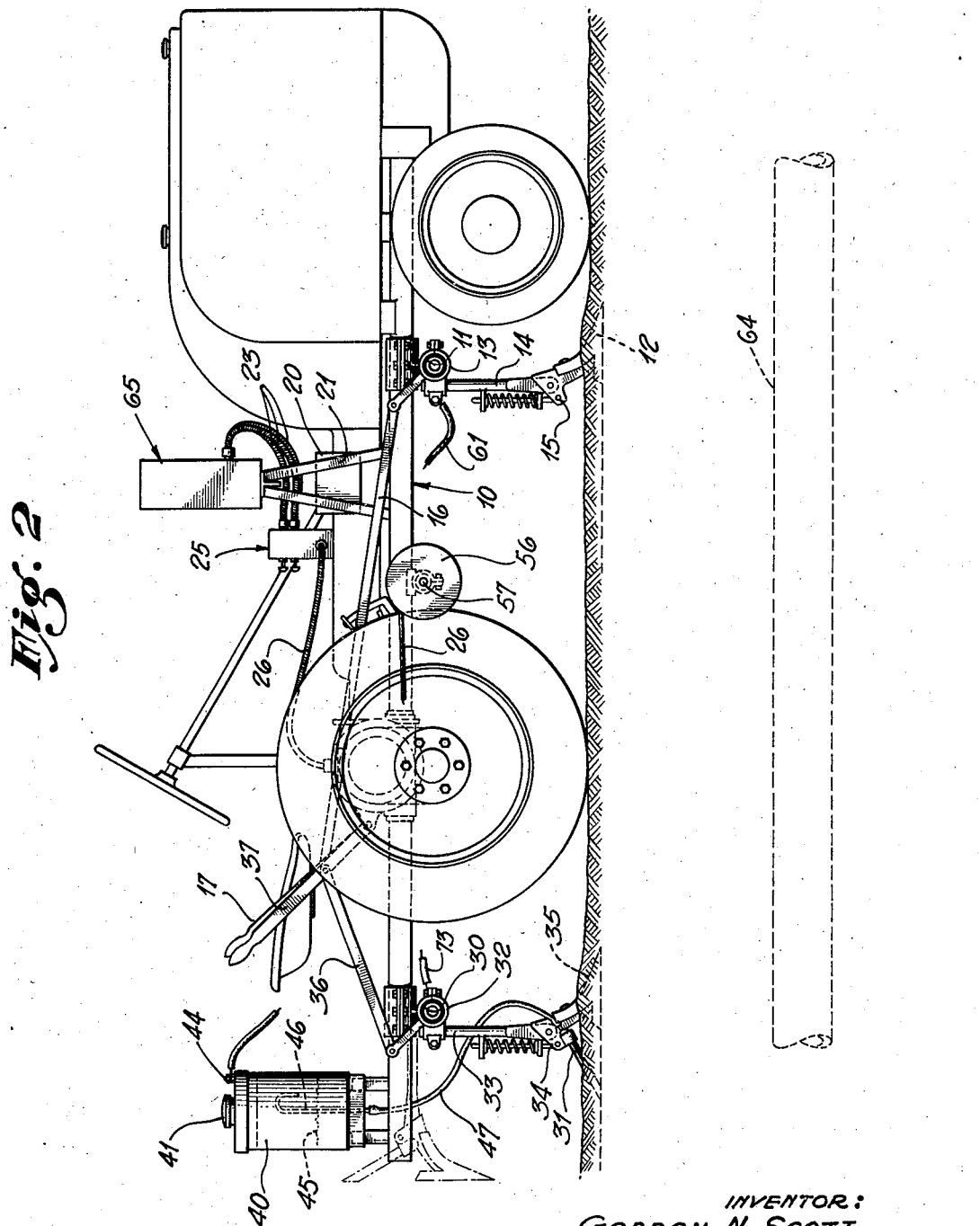

INVENTOR:
GORDON N. SCOTT,
BY Robert M. McManigal
ATTORNEY.

June 19, 1945.  G. N. SCOTT  2,378,440
PROCESS AND MEANS FOR MEASURING SOIL RESISTIVITY AND CERTAIN
ELECTRICAL CHARACTERISTICS ASSOCIATED WITH BURIED PIPELINES
Filed Jan. 27, 1941  5 Sheets-Sheet 5

INVENTOR:
GORDON N. SCOTT,
BY Robert M. McManigal
ATTORNEY.

Patented June 19, 1945

2,378,440

UNITED STATES PATENT OFFICE 2,378,440

PROCESS AND MEANS FOR MEASURING SOIL RESISTIVITY AND CERTAIN ELECTRICAL CHARACTERISTICS ASSOCIATED WITH A BURIED PIPE LINE

Gordon N. Scott, Beverly Hills, Calif.

Application January 27, 1941, Serial No. 376,134

15 Claims. (Cl. 175—183)

My invention relates broadly to a process and means for obtaining measurements pertaining to buried pipelines and particularly to methods and means for securing complete records thereof.

In a process for determining the corrosive quality of soil along a right-of-way, for locating corroded pipe and for studying the effects of the electrical process of cathodic protection, a multitude of measurements must be made. Heretofore practice consisted of making such measurements over the right-of-way at long intervals determined in part by the demands of economy. Such prior practice is haphazard, slow, tedious and expensive and yields results which are both inaccurate and misleading, and may in some instances be of no significance owing to the lack of intermediate values in measurement. My invention on the contrary permits continuous and simultaneous measurement of and recording of a variety of quantities and eliminates all of the aforementioned disadvantages and objections. Furthermore, in certain embodiments of my invention, novel measurable quantities obtained by certain novel geometrical arrangements, are made useful by my invention.

An object of my invention is to provide a process and means for measuring substantially continuously one or more characteristics of the soil such as the resistivity, either singly or together with certain other electrical characteristics associated with a pipeline such as the potential of the pipe with reference to an electrode in contact with adjacent or remote soil, the sign and magnitude of radial earth currents, the potential gradient through the soil over the pipe and the drop in potential through a coating caused by an interrupted external source of current discharged between a remote point in the soil and the pipeline.

Another object of my invention is to provide a process and means for measuring over an elected path without material excavation and substantially continuously a property of the soil related to its corrosive quality.

Another object of my invention is to provide a process and means for measuring substantially continuously the soil resistivity in an open trench in which a pipeline is to be laid.

Another object of my invention is to provide a non-polarizing electrode which is adapted to be moved continuously along the ground and which is adapted to be in good electrical contact with the soil over the entire distance over which it is moved.

Another object of my invention is to provide a process and means for measuring substantially continuously the potential of a buried pipeline with reference to a moving electrode in contact with the soil and preferably in which the radial geometric relation of the moving electrode is substantially fixed with relation to the longitudinal axis of the pipeline.

Another object of my invention is to provide a process and means for measuring substantially continuously the potentials of a plurality of buried parallel and adjacent pipelines with reference to a moving electrode in contact with the soil.

Another object of my invention is to provide a process and means for measuring substantially continuously the potential gradients in the soil either alone or in relation to a buried pipeline and preferably in some fixed geometrical relation with the pipeline.

Another object of my invention is to provide a process and means for measuring substantially continuously and substantially simultaneously the potential gradients in the soil lying in a moving plane perpendicular to the axis of a buried pipeline in which the electrodes in the moving plane bear a constant geometric relation to the intersection of the axis of the pipeline with the moving plane and preferably lying in a moving plane perpendicular to the axis of a buried pipeline wherein an electrode in the plane lies substantially vertically over the axis of the pipeline.

Another object of my invention is to provide a process and means for measuring substantially continuously and substantially simultaneously the potential gradients in the earth surface lying in a moving plane perpendicular to the axis of a buried pipeline in which an electrode in the plane lies substantially vertically over the axis of the pipeline and in which two lateral electrodes on opposite sides of the center electrode are spaced equally therefrom a distance which is a geometrical function of the shortest distance from the center electrode to the axis of the pipeline and preferably in which the spacing of the lateral electrodes bears such a determined geometric relationship with the distance in the soil between the contact point of the center electrode and the axis of the pipeline that the potential gradient therein is numerically equal to the gradients taken laterally in order that from said plurality of instantaneously associated measurements, the potential of the pipeline exclusive of soil gradients may be determined.

A further important object of my invention is to provide a process and means for measuring substantially continuously and substantially simultaneously the relativity of the soil and the potential gradients in the soil on either side of a point immediately over a buried pipeline so that from the associated measurements of resistivity and potential gradients the approximate density of the current entering or leaving the pipeline radially through the soil may be determined.

Another object of my invention is to provide a process and means for measuring substantially continuously and substantially simultaneously the potential of a pipeline with reference to a moving electrode in contact with the soil, the potential gradients in the soil and the resistivity of the soil.

Another object of my invention is to provide a process and means for measuring substantially continuously and substantially simultaneously in conjunction with an external source of current discharged to the pipeline from a point in the soil and in further conjunction with means intermittently to interrupt the current, the potentials of a coated pipeline with reference to a moving electrode at the particular point in the soil over the pipe, and the soil gradients in the soil laterally displaced from the said center point in the two instances of applied and interrupted soil currents whereby from said plurality of associated measurements may be determined the effect of cathodic polarization on the pipeline and the drop in potential through the coating due solely to the imposed soil currents.

Another object of my invention is to provide a process and means for measuring substantially continuously and substantially simultaneously in conjunction with an external source of current discharged to the pipeline from a point in the soil and in further conjunction with means intermittently to interrupt the current, the resistivity of the soil, the potentials of a coated pipeline with reference to an electrode at a point in the soil over the pipe, and the soil gradients in the soil laterally displaced from the said center point in the two instances of applied and interrupted soil currents whereby from said plurality of associated measurements may be determined the effect of cathodic polarization on the pipeline, the drop in potential through the coating, the average current which enters the pipe radially and which is due solely to the imposed soil currents, and the conductance of the coating.

Another object of my invention is to provide a process and means whereby all of the foregoing substantially continuous measurements and combinations of measurements may be singly and in combination recorded substantially continuously and substantially simultaneously and preferably in units of distance whereby such continuous records are related in point to point correspondence with the distance from a fixed point in space measured by the progress of the vehicle upon which are mounted the means for applying the invention.

By the term substantially continuously it is meant that the measurements are recorded on the chart in regular linear intervals, however small, arbitrarily fixed within limits by the characteristics of the meters and markers of the recorders.

By the term substantially simultaneously it is meant that two or more measurements are recorded on a chart in regular linear intervals either truly simultaneously or staggeredly wherein the latter case a single meter in place of two or more may be adapted to one recorder alternately and regularly to record the several measurements.

My invention has many other objects, advantages, and features, some of which, with the foregoing, will be set forth in the following description where I shall outline certain forms of my invention which I have selected for illustration in the drawings accompanying and forming a part of the present specification.

Referring to the drawings:

Figure 1 is a top view of a device embodying the features of my invention.

Figure 2 is a side view of the device shown in Figure 1.

Figure 3 is a schematic drawing showing the details of the recorder drive mechanism.

Figure 4 is a view, partly in section, of the non-polarizing electrode assembly.

Figure 5 is a section of the portion of the non-polarizing electrode adapted to contact the soil.

Figure 6:
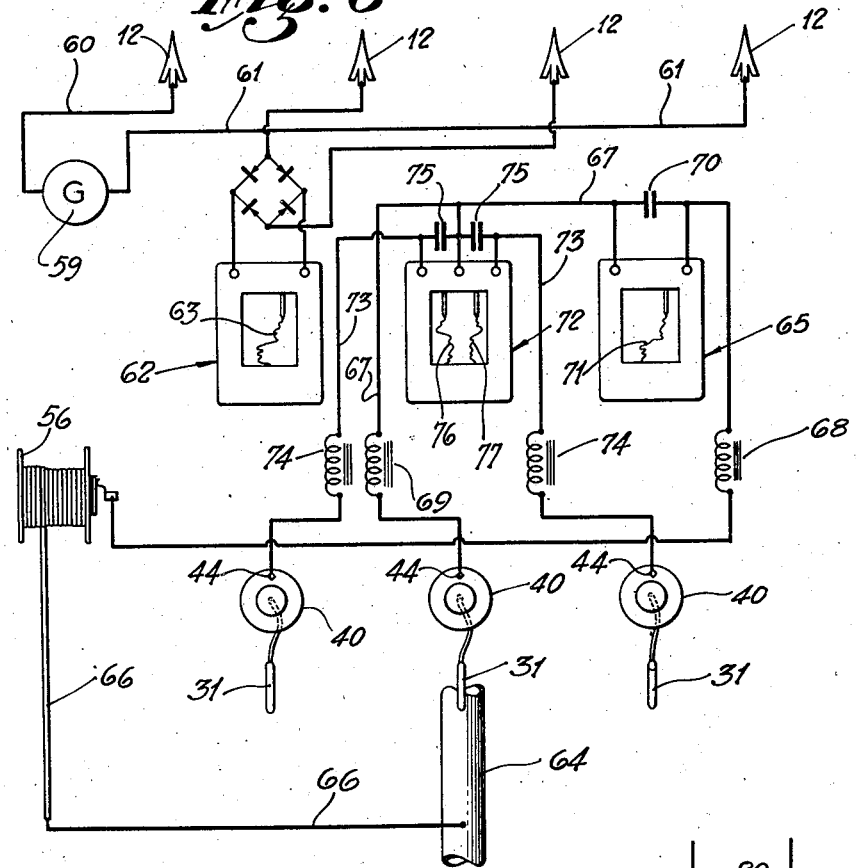
Figure 6 is a schematic drawing of the electrical circuits of the device shown in Figure 1.

Referring to Figures 1 and 2 of the drawings, the numeral 10 indicates the frame of a vehicle which may be either externally or self-propelled, for example, the frame of a conventional tractor. Means are mounted on the frame 10 to provide a substantially continuous record of the resistivity of the soil over which the vehicle is moving irrespective of the presence or absence of pipelines. As an instance of this arrangement, the frame 10 is provided with an insulated support 11. A plurality of electrodes 12 are adjustably mounted on the support 11 by means of sleeves 13, rods 14, spring arms 15, so that the electrodes 12 can rise over any obstructions that the electrodes might engage and so that the electrodes are forced into intimate contact with the soil. The electrodes 12 may be formed of suitable steel members and the lower ends may be in the form of a plow in order to cut a shallow furrow in the soil to the desired depth in order to provide a good electrical contact with the soil.

In order to raise and lower the electrodes 12, a rod 16 is connected to the support 11 and a lever 17 is provided to move the rod 16 and thereby raise or lower the electrodes 12.

The outer two of the electrodes 12 are wired to a constant current oscillator (not shown), carried in the oscillator compartment 20 which is attached to the supports 21 carrying the meters. The inner electrodes 12 are wired to a recording meter.

Means are provided so that one or more, and preferably all of the recording meters are operated synchronously with the vehicle, without reference to time. As an instance of this arrangement and as shown in Figure 3, the recording meters are operated by means of flexible shafts 23 which are attached to a set of reducing gears 24 in the gear box 25. The gears 24 in the gear box 25 are caused to turn by the flexible shaft 26 which is geared to a gear 27 on the wheel axle 28 within the axle housing 29.

Means are also mounted on the frame 10 to provide a substantially continuous record of certain electrical characteristics of the pipeline and the soil. As an instance of this arrangement, an insulated support 30 is mounted on the frame 10. A plurality of non-polarizing electrodes 31 are adjustably mounted on the support 30 by means of sleeves 32, rods 33, and spring arms 34 so that the electrodes 31 can rise over any obstructions that the electrodes 31 might engage and so that the electrodes 31 are forced into intimate contact with the soil. Each electrode 31 is also provided with a plow 35 which is adapted to cut a shallow furrow in the soil to the desired depth in order to insure good electrical contacts of the electrodes, with the soil. In order to raise and lower the electrodes 31, a rod 36 is connected to the support 30 and a lever 37 is provided to move the rod 36, and thereby raise and lower the electrodes 31.

Referring to Figures 4 and 5, I show one form of a nonpolarizing electrode which is suitable for use in connection with my invention. Mounted in the vehicle and insulated therefrom are a plurality of copper containers 40 which are closed by wide mouth copper caps 41 which are provided with baffles 42 and air vents 43. Also provided on the containers 40 are electrical terminals 44 of copper. Within the containers are crystals of copper sulphate 45 and saturated aqueous solutions thereof. Also within the containers and extending through them are copper tubes 46 adapted to permit the passage of only saturated copper sulphate solution through the rubber hoses 47 to the electrodes 31.

Referring to Figure 5 the copper sulphate electrode 31 may be composed of a cylinder 50, formed of non-metallic material, such as Lucite or wood. The lower end of the cylinder 50 is preferably flattened to contact the soil in the bottom of the furrow cut by the plow 35. Small holes 51 are provided on the trailing section 52 and the bottom portion 53 of the cylinder 50. The holes 51 are drilled on the bottom surface 53 parallel to the axis of the cylinder 50 and parallel to the ground surface on the trailing edge 52. The holes 51 are designed to prevent clogging by the soil and to provide seepage of the copper sulphate solution to insure electrical contact of the soil with the solution within the containers 40. The cylinder 50 is closed by a threaded cap 54 having a fluted extension 55 for sealing engagement with the rubber hose 47.

Reels 56 of insulated wire are mounted on the support 57. The reels are adapted to provide many hundred feet of insulated wire for a purpose to be described hereinafter.

The resistivity measurements may be obtained as follows:

In an arrangement of four equally spaced collinear electrodes 12, the potential difference between the inner pair of electrodes is directly proportional to the average resistivity of a hemisphere of the soil encompassed by a radius equal to the electrode spacing when a constant current is caused to pass between the outer electrodes. An instance of this arrangement is shown in Figure 6 in which a source 59 of alternating current of constant strength is caused to pass between the outer electrodes 12 by means of lead wires 60 and 61 and in which the alternating potential developed between the inner pair of elctrodes 12 is rectified and measured on the recording meter 62. As the vehicle is moved over the ground, a record 63 of the resistivity of the soil is obtained, said record being in point of distance without reference to time in that the recorder is synchronized with the movement of the vehicle.

The potential of a pipeline may be measured with respect to any point in the soil, and a substantially continuous record of said potentials may be obtained by maintaining as the vehicle moves a constant radial geometric relation of an electrode with respect to the axis of the pipeline. Referring to Figure 6, in which the use of three non-polarizing electrodes 31 is indicated, means are shown for measuring the potential of the center electrode 31 over the pipe 64. The pipe 64 is connected to a recording voltmeter 65 by means of insulated wire 66 from one of the reels 56. The center electrode 31 is connected to said voltmeter 65 and to the terminal 44 of the copper container 40 by means of insulated wire 67. In the circuit are provided chokes 68 and 69 and a condenser 70 to eliminate the effects of alternating currents. As the vehicle is moved over the surface of the ground, the plow 35 cuts a shallow furrow in the soil in which the center electrode 31 is adapted to follow. A small amount of copper sulphate solution is adapted to seep through the small holes 51 in order to insure contact of the soil with the solution in the container 40. As the vehicle is moved over the surface of the ground in constant geometric relation with respect to the pipeline 64, a record 71 is obtained of the variations in potential of the pipeline 64 with respect to the center electrode 31 in contact with the soil. As shown in Figure 6, for reasons which will be made evident hereinafter, I prefer to have the center electrode 31 in contact with the soil directly above the pipeline 64, although in other applications of my invention, I place an electrode 31 at other geometrical configurations with respect to the pipeline 64.

The sign and magnitude of the potential in the earth surface on a section of soil between points over the pipeline and laterally displaced therefrom serves to indicate whether the pipeline is picking up or discharging current which data gives important information on the condition of the pipe with respect to corrosion as well as other useful information.

Since relative magnitude and the signs of the potential gradients may be different on each side of the pipeline it is advisable to measure both potential differences of the outer electrodes with respect to the central electrode 31.

The recording meter 72 contains two millivoltmeters, the common terminal of which is connected to the central copper sulphate electrode 31 through the lead wire 67. The outer electrode 31 are connected through the terminals 44 of the copper containers 40 and the lead wires 73 to the appropriate terminals of said recording meter 72. Chokes 74 and condensers 75 are provided to eliminate the effects of alternating currents. As the vehicle is moved over the surface of the ground a record 76 is obtained of the difference in potential of the center electrode with respect to one of the outer electrodes and a record 77 is obtained of the difference in potential of the center electrode with respect to the other outer electrode, said records being in point of distance rather than with reference to time in that the recording meter 72 is synchronized with the movement of the vehicle.

When the electrode 31 spacing $x$ bears the hereinafter fixed relation with the quantity $h$ which is the sum of the depth of the soil above the pipeline and the pipeline radius $a$, then the average of the readings at that particular point on the records 76 and 77, $\Delta V_x$, is numerically equal to the difference in potential existing in the soil between the center electrode and the pipe surface. In other words the records 76 and 77 indicate the differences in potential in, or the $ir$ drop through the soil between the center electrode and the pipe surface when the geometrical factors bear the following relation:

$$x = \frac{h(h-a)}{\sqrt{a(2h-a)}}$$

It is obvious that the record 71 may be corrected by the use of the records 76 and 77 since the potential of the pipe as indicated by the record 71 contains the average of the potentials of records 76 and 77 existing between the center electrode and the pipe surface.

Furthermore, providing that the size of the pipe is fixed, that the depth of the soil above the pipe is reasonably constant, and that the records 63, 76 and 77 have been taken substantially simultaneously, the density of the current entering or leaving the pipe may be calculated from the relation $$\text{Current density} = \frac{K \Delta V_x}{\text{Soil resistivity}}$$

in which "K" is a constant of logarithmic form in which are as variables the quantities $a$, $h$, and $x$ and in which $\Delta V_x$ is the average difference in potential measured in the soil between the center electrode and the outer electrodes.

If in the particular measurements sought the $ir$ drop through the soil is of negligible importance in comparison to the magnitude of the radial currents then clearly by suitable electrode spacing the value of the constant K may be so fixed in round numbers as greatly to facilitate subsequent use of the records.

Figure 7:
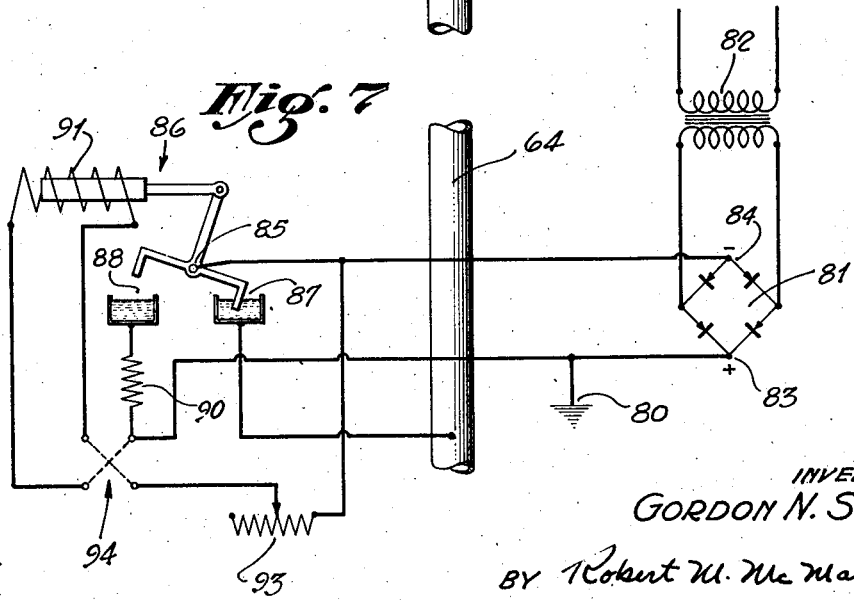
Figure 7 is a schematic drawing of electrical circuits adapted to be used in conjunction with the electrical circuits shown in Figure 6 in a modification of my invention.

In Figure 7, in which are schematically illustrated embodiments of a modification of my invention adapted to be used in conjunction with the electrical circuits shown in Figure 6, is shown a typical cathodic protection installation to which has been adapted means for intermittently interrupting the cathodic current. One instance of this arrangement is as follows:

In the modified cathodic protection installation illustrated are shown the pipeline 64, an externally placed anode 80, a rectifier 81, coupled through a transformer 82 to a source of alternating current. The positive terminal 83 of the rectifier is connected to the anode 80. The negative terminal 84 of the rectifier is connected to a common terminal 85 of a magnetically operated mercury switch 86, one terminal 87 of which is connected to the pipeline 64. The other terminal 88 of the magnetically operated switch 86 is connected to the positive terminal of the rectifier 81 through a resistance 90. The solenoid 91 of switch 86 is energized by a small portion of the rectifier current which is caused to pass through the variable resistance 93 and a polarity changer 94 diagrammatically shown in Figure 7 as connected to one position of polarity. The operation of the polarity changer by a conventional time clock (not shown) is such as to cause the solenoid leads alternately to connect to the fixed polarities of the rectifier leads. The change in polarity of the solenoid 91 is such as to intermittently open and close the terminals 87 and 88 of the switch 86. The resistance 90 is approximately equal to the overall resistance of the anode 80 and the pipeline 64. In this way, the output of the rectifier is maintained substantially constant while due to the action of the switch 86, the current is intermittently diverted from the soil through the resistance 90.

In the operation of this modification, two records are obtained on the recording meter 65, one of which records is a record of the potential of the pipe with reference to the center electrode while the current through the soil from the rectifier is interrupted, and the other record is a record of the potential of the pipe 64 with reference to the center electrode while the current from the rectifier is passing through the soil to the pipe. Similarly four records or curves are obtained on the recording meter 72, one pair of which is a record of the potential gradients in the soil while the current through the soil from the rectifier is interrupted and the other pair of which is a record of the potential gradients in the soil while the current is passing through the soil to the pipeline 64.

As the vehicle moves over the surface of the ground, substantially continuous records are made.

Considering a pair of the records or curves on the recording meter 72 obtained from the central electrodes 31 and one of the outer electrodes 31, it is apparent that the difference of potential $(\Delta_i V_x)$ at any point in the records or curves is due solely to the interrupted current from the rectifier and that the average of this value of $\Delta_i V_x$ and the similar value from the central electrode and the other outer electrode together with the measured resistivity of the soil provides the information from which can be calculated the average radial current density due to the rectifier current in the soil alone in accordance with the formula set forth on line 26 supra.

Further, said average value of $\Delta_i V_x$ is approximately equal numerically to the drop in potential between the central electrode and the surface of the pipeline 64, or of the outer surface of the coating if the pipe is coated, caused solely by the rectifier current in the soil.

Similarly, considering the pair of records or curves obtained on the recording meter 65 it is evident that the difference in potential between the two curves at any particular point measures the drop in potential through the soil from the central electrode to the surface of the pipe, or to the outer surface of the coating if the pipe is coated, and the drop through said coating caused solely by the rectifier current in the soil. Accordingly, the resistance of the coating, if any, is readily calculated at any particular point in the curves from the difference in the values obtained from the records 71 of the recording meter 65 by subtracting therefrom the average of the values $\Delta_i V_x$ and dividing the result by the calculated density of the current in the soil due to the rectifier alone.

Figure 8:
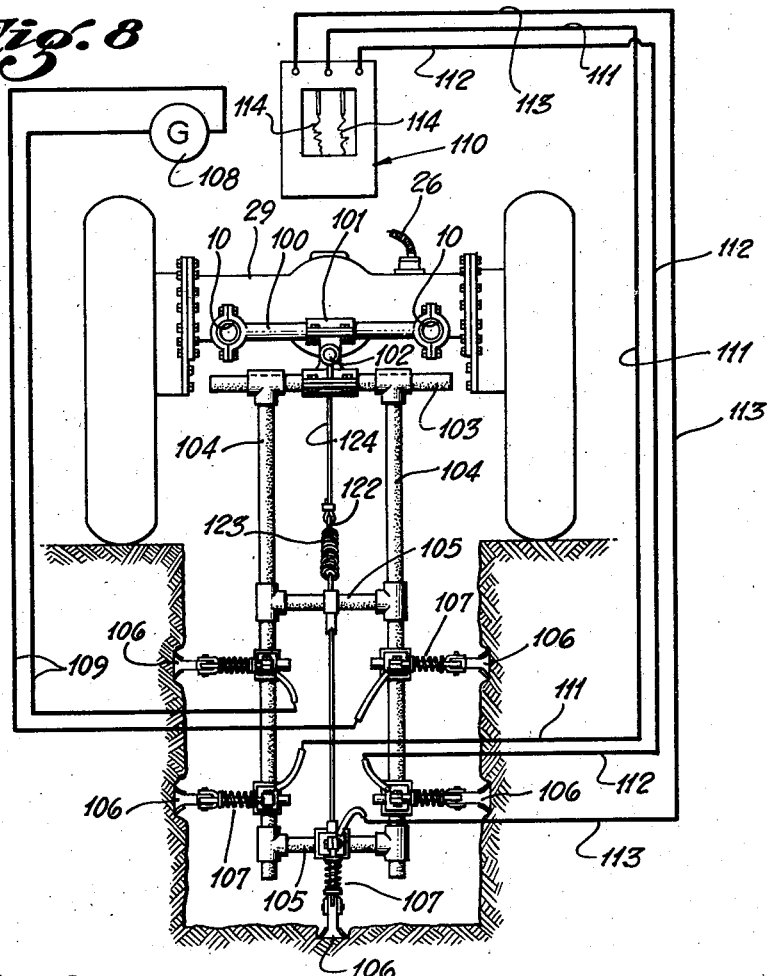
Figure 8 is a rear view of a modification of my invention for measuring the resistivity of the soil in an open trench.

In the modification of my invention shown in Figure 8, I show a device adapted to measure the resistivity of the soil particularly in the lower portion of an open trench which is adapted to receive a pipeline. A rigid support 100 is mounted on the frame 10. The support 100 is provided with a fixed sleeve 101 which is adapted to be connected by a rotary joint 102 to a support 103. The rotary joint 102 is adapted to permit the support 103 to be moved laterally in said joint and to rotate the support 103 by control means (not shown). An insulated frame 104 is suspended from the support 103 and braced by insulating cross members 105. A plurality of electrodes 106 are adjustably mounted on the pendant members 104 and the cross members 105 by means of assemblies 107 comprising sleeves, rods, spring arms and springs to permit in operation the free and independent movement of the several electrodes 106. The electrodes may be formed of suitable steel members and the lower ends may be in the form of plows in order to cut shallow furrows in the soil to the desired depth so that good electrical contacts between the electrodes and the soil are assured.

One method of measuring the resistivity of the soil is shown schematically in Figure 8. A source of alternating current 108 of fixed strength is caused to pass through the soil between the two uppermost electrodes by means of the lead wires 109. The bottom electrode 106 is connected to terminals one on each of two meters in the recording meter 110 by means of the wire 113. The remaining two electrodes 106 are connected one each to the other terminals of the meters in the recording meter 110 by means of the wires 111 and 112.

In the above described arrangement the potential differences in the earth developed by the current discharged from the oscillator 108 are measured between the bottom electrode 106 and one of the lower horizontal electrodes 106 and between the bottom electrode and the other lower horizontal electrode 106. Since the bottom electrode is common in each pair of electrodes between which the potential is measured, variations in said measurements at any particular point are attributable to differences in the soil immediately surrounding the lower electrodes.

Providing both the strength of the current discharged from the upper electrodes and the geometrical relationship of the substantially coplaner electrodes remain unchanged, then it may be shown the resistivity of the soil is directly proportional to the measured values of the potential differences.

As the vehicle is moved over the ground, two records 114 of the resistivity of the soil are obtained, said records being in point of distance rather than with reference to time since the recorder is synchronized with the movement of the vehicle.

Figure 9:
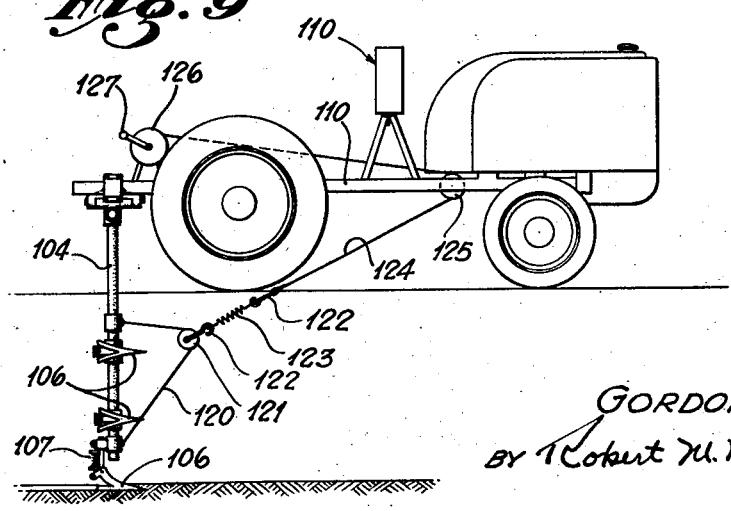
Figure 9 is a fragmentary side view of the modification shown in Figure 8 showing one means to raise and lower the electrode assembly in and out of an open trench.

In Figure 9 are shown means to hold the frame members 104 in a vertical position in the trench and to rotate the said frame out of the trench. In more detail the frame member 104 is connected to a cord 120 which passes over the pulley 121. The pulley 121 is connected by means of the hooks 122 and the spring 123 to the cord 124 which is passed over the wheel 125 affixed to the frame 10 to the drum 126 which is provided with the crank 127.

It will be apparent that my invention is adapted to be used in connection with the exploration of plots of ground for the purpose of most advantageously placing anodes for cathodic protection in that the final resistance of the anode, lower in the lower resistance soils, in part determines the consumption of power.

Similarly in some systems of cathodic protection a multiplicity of small distributed anodes are laid in preference to the customary widely separated installations. In such instances not only is the location of low resistance ground important for the anodes but also the location of the anodes in opposition to the pipeline in regions where current enters the soil from the pipeline leads to most advantageous distribution of the imposed currents and in these measurements of the soil gradients about a pipeline and the soil resistivity my invention is of particular utility.

In the matter of applications my device may be used to secure records from which may be drawn the equipotential contours and the like over an area within which lie two or more pipelines for the purpose of studying the effects of cathodic protection applied to the one pipeline, for instance, on the others.

Furthermore, the effect of one of two parallel pipelines upon the other may be studied by my invention using four electrodes in particular substantially collinear arrangement. For instance the continuous and simultaneous records of the surface earth gradients on the outside of each of the pipelines would indicate whether an exchange of current was occurring in that, it may be shown, gradients of like sign would indicate current exchange and also the pipeline polarities and in that gradients of unlike sign would indicate simultaneous pick up or discharge of current. Furthermore, additional simultaneous records of the individual pipe potentials with reference to their adjacent electrodes would greatly add to the value of the first mentioned records in that the records would also tend to show the polarity of the pipe with reference to the soil.

From the foregoing description taken in connection with the accompanying drawings, the uses, advantages, and operation of my invention will be readily understood by those skilled in the art to which the invention appertains. While I have described the principle of operation together with the forms of my invention which I now consider to be the best embodiment thereof, I desire to have it understood that the articles shown are merely illustrative and that the invention is not to be limited to the details disclosed herein, but is to be accorded the full scope of the appended claims.

I claim:

1. A process of substantially continuously and substantially simultaneously measuring the potential gradients in the soil on both sides of the vertical plane through the axis of a buried pipeline which comprises positioning a center electrode in said vertical plane, electrically connecting said electrode with two meters, positioning one electrode on each side of said center electrode and in a plane perpendicular to said vertical plane and at such a distance from said center electrode which is that particular geometrical function of the shortest distance from the center electrode to the longitudinal axis of the pipeline so that the average of the measured gradients is approximately numerically equal to the earth gradient between said center electrode and said pipeline, connecting each of said last mentioned electrodes each to one of said meters, and moving said electrodes parallel to said pipeline and in continuous electrical contact with the soil.

2. A process of determining over a length of buried pipeline the potential of said pipeline with reference to a moving electrode in electrical contact with the soil exclusive of soil gradients by measuring the potential of the pipeline with reference to an electrode in electrical contact with the soil and subtracting therefrom the earth gradients between said electrode and said pipeline which comprises substantially continuously and substantially simultaneously measuring the potential of said buried pipeline with reference to a non-polarizing electrode in electrical contact with the soil by positioning said electrode in a vertical plane through the axis of the buried pipeline and by positioning one electrode on each side of said plane at a distance from the center electrode and in a plane perpendicular to the axis of said pipeline and at such a distance from said center electrode which is that particular geometrical function of the shortest distance from the center electrode to the longitudinal axis of the pipeline so that the average of the measured gradients is approximately numerically equal to the earth gradient between said center electrode and said pipeline, by electrically connecting said first mentioned electrode with each of three meters, one of which meters is electrically connected to said pipeline, and by electrically connecting each of said last mentioned electrodes each to one of the two of said meters which are not connected to said pipeline, and moving said electrodes in continuous electrical contact with the coil and parallel to the pipeline.

3. A process of substantially continuously and substantially simultaneously measuring over a length of buried pipeline the potential of said pipeline with reference to a non-polarizing electrode in electrical contact with the soil, and the potential gradients in the soil adjacent said pipeline in conjunction with an intermittently interrupted source of current discharged from a point in the soil to said pipeline.

4. A process of substantially continuously and substantially simultaneously measuring over a length of buried pipeline the potential of said pipeline with reference to a non-polarizing electrode in electrical contact with the soil, the potential gradients in the soil adjacent said pipeline and the resistivity of said soil in conjunction with an intermittently interrupted source of current discharged from a point in the soil to said pipeline, and determining from these factors the instantaneous value of the current density at the point of measurement.

5. A device for obtaining a substantially continuous record of the resistivity of the soil over which the device is adapted to be moved comprising a vehicle, a plurality of electrodes in fixed separation mounted on and insulated from said vehicle, said electrodes being adapted for continuous movement over the surface of the soil and to make continuous electrical contact with the soil, certain of said electrodes being connected to a source of current, and a recording meter connected to others of said electrodes, said recording meter being mounted on said vehicle and the chart of said recording meter being adapted to be moved in direct proportion to the forward movement of said vehicle.

6. A device for obtaining a substantially continuous record of the resistivity of the soil about a buried pipeline over which the device is adapted to be moved comprising a vehicle, a plurality of substantially collinear equally spaced electrodes mounted on and insulated from said vehicle, said electrodes being adapted to make a shallow furrow in the surface of the soil as the vehicle is moved in order to insure continuous electrical contacts of said electrodes with said soil, said electrodes being spaced in such relation as to provide readings of the resistivity of the soil to substantially the depth of said pipeline, certain of said electrodes being connected to a source of current and others of said electrodes being connected to a recording meter.

7. A device for obtaining a substantially continuous record of the potential of a length of buried pipeline with reference to a moving non-polarizing electrode in contact with the soil comprising a vehicle having mounted thereon means to make a shallow furrow as the vehicle is moved, a non-polarizing electrode, a recording meter and a length of insulated wire, said electrode being adapted to electrically contact the soil in said furrow and electrically connected to said meter, and said pipeline being connected to said meter by said insulated wire.

8. A device for obtaining a substantially continuous record of the potential gradients in the soil above a buried pipeline, over which the device is adapted to be moved comprising a vehicle, a plurality of substantially collinear electrodes, and recording meters mounted on said vehicle, said electrodes being adapted to make continuous electrical contact with the soil as the vehicle is moved over said soil, the center electrode being electrically connected to both of said meters, and the outer electrodes being connected one to each of said meters.

9. A device for obtaining a substantially continuous record of the potential gradients in the soil adjacent a buried pipeline over which the device is adapted to be moved comprising a vehicle, a plurality of substantially collinear electrodes and meters mounted on said vehicle, said electrodes being adapted to make continuous electrical contact with the soil and spaced in such relation that the average difference in potential between the center electrode and the outer electrodes is substantially the same as the difference in potential between the center electrode and the surface of said pipeline, the center electrode being electrically connected to both of said meters and the outer electrodes being connected one to each of said meters.

10. A device including a vehicle for obtaining substantially continuous and substantially simultaneous records of the resistivity of the soil about a buried pipeline over which the vehicle is adapted to be moved, of the potential of said pipeline with reference to a non-polarizing electrode in electrical contact with said soil, of the change in said potential caused by an interrupted external source of current discharged into the soil from a point in the soil to the pipeline, of the potential gradients in the soil adjacent said pipeline and of the changes in said gradients caused by the interruption of said external current which comprises a large electrode in the soil remote from said pipeline and electrically connected to a source of direct current, said source of direct current being electrically connected to said pipeline, means for intermittently interrupting said current, said vehicle having a plurality of collinear equally spaced electrodes mounted on and insulated from said vehicle, said electrodes being spaced in such relation as to provide records of the resistivity of the soil to substantially the depth of said pipeline, certain of said electrodes being connected to a source of alternating current and others of said electrodes being connected to a recording meter, a plurality of substantially collinear non-polarizing electrodes each insulated from each other and from said vehicle and three meters provided with alternating current chokes and by-pass condensers all mounted on said vehicle, said non-polarizing electrodes being adapted to make continuous contact with the soil and spaced in such relation that the average difference in potential between the center electrode and the outer non-polarizing electrodes is substantially the same as the difference in potential between the center non-polarizing electrode and the surface of said pipeline, said center non-polarizing electrode being electrically connected to all three of said last-mentioned meters, and the other of said non-polarizing electrodes being connected one to each of two of said last-mentioned meters, the third of said last-mentioned meters being electrically connected to said pipeline.

11. A device for obtaining substantially continuous measurements of an electrical characteristic of an energized soil over which the device is adapted to be moved comprising a vehicle, a plurality of relatively fixed electrodes mounted on and insulated from said vehicle, said fixed electrodes being adapted for continuous movement over the surface of the soil and to make continuous electrical coupling with said energized soil, and a meter carried by said vehicle and connected to said electrodes.

12. A device for obtaining substantially continuous measurements of an electrical characteristic associated with an energized underground pipe line over which the device is adapted to be moved comprising a vehicle, a plurality of relatively fixed electrodes responsive to energization mounted on and insulated from said vehicle, said fixed electrodes being adapted for continuous movement over the surface of the soil and to make continuous electrical coupling with said energized pipe line, and a meter carried by said vehicle and connected to said electrodes.

13. A device for obtaining a substantially continuous record of the resistivity of the soil about a buried pipeline over which the device is adapted to be moved, comprising a vehicle, a recording meter, a source of current, a plurality of relatively fixed electrodes mounted on and insulated from said vehicle, said electrodes being spaced in such relation as to provide readings of the average resistivity of the soil to the order of the depth of said pipeline, certain of said electrodes being connected to said source of current and others of said electrodes being connected to said recording meter.

14. A device for obtaining a substantially continuous record coordinated with distance but independent of time, of the electrical characteristics of the soil over which the device is adapted to be moved, comprising a vehicle, a plurality of electrodes mounted on and insulated from said vehicle, said electrodes being constructed and arranged to make continuous electrical contact with the soil, a source of current, means for connecting said source to certain of said electrodes, a recording meter carried by said vehicle, and including a chart, and means for causing said chart to move through a distance directly proportional to the distance of forward movement of said vehicle.

15. A device for obtaining a substantially continuous record of an electrical characteristic of an energized soil over which the device is adapted to be moved comprising a vehicle, a plurality of electrodes in fixed separation mounted on and insulated from said vehicle, said electrodes being adapted for continuous movement over the surface of the soil and to make continuous electrical contact with the soil, and a recording meter connected to certain of said electrodes, said recording meter being mounted on said vehicle and the chart of said recording meter being adapted to be moved in direct proportion to the forward movement of said vehicle.

GORDON N. SCOTT.